United States Patent
Hirao et al.

(10) Patent No.: US 7,370,980 B2
(45) Date of Patent: May 13, 2008

(54) PROJECTION TYPE VIDEO DISPLAY

(75) Inventors: Yoshichika Hirao, Osaka (JP); Naoki Kaise, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 319 days.

(21) Appl. No.: 10/890,988

(22) Filed: Jul. 15, 2004

(65) Prior Publication Data

US 2005/0012908 A1 Jan. 20, 2005

(30) Foreign Application Priority Data

Jul. 17, 2003 (JP) ............................. 2003-276044
Jul. 17, 2003 (JP) ............................. 2003-276045

(51) Int. Cl.
*G03B 21/14* (2006.01)
*H04N 3/22* (2006.01)
(52) U.S. Cl. .................. 353/101; 353/69; 348/745
(58) Field of Classification Search .............. 353/69, 353/70, 101, 121; 348/745, 746
See application file for complete search history.

(56) References Cited

U.S. PATENT DOCUMENTS

| | | | |
|---|---|---|---|
| 6,520,647 B2 * | 2/2003 | Raskar | 353/70 |
| 6,592,228 B1 * | 7/2003 | Kawashima et al. | 353/101 |
| 6,862,086 B2 * | 3/2005 | Kanemitsu | 356/139.1 |
| 7,175,285 B2 * | 2/2007 | Li et al. | 353/70 |
| 2003/0223048 A1 * | 12/2003 | Kimura | 353/70 |
| 2004/0184011 A1 * | 9/2004 | Raskar et al. | 353/94 |
| 2005/0024606 A1 * | 2/2005 | Li et al. | 353/121 |
| 2005/0168705 A1 * | 8/2005 | Li et al. | 353/69 |

FOREIGN PATENT DOCUMENTS

| | | |
|---|---|---|
| JP | 2002-213946 | 7/2002 |
| JP | 2003-57531 | 2/2003 |
| JP | 2003-78842 | 3/2003 |

* cited by examiner

*Primary Examiner*—Andrew T. Sever
(74) *Attorney, Agent, or Firm*—Westerman, Hattori, Daniels & Adrian, LLP.

(57) ABSTRACT

At the time of manual adjustment, a motor driving signal corresponding to a user's key operation is fed to a focusing motor from a microcomputer through a switch. At the time of automatic adjustment, the switch selects a motor driving signal from a sensor and feeds the selected motor driving signal to the focusing motor. The sensor contains a dedicated microcomputer. The dedicated microcomputer samples an image pick-up signal of a CCD line sensor in the sensor to generate contrast data, and automatically drives the focusing motor, to automatically make focusing adjustment.

6 Claims, 6 Drawing Sheets

PROJECTION TYPE VIDEO DISPLAY

BACKGROUND OF THE INVENTION

Field of the Invention

The present invention relates to a projection type video display such as a liquid crystal projector.

Examples of the contents of adjustment of setting at the time of projection of a projection type video display include focusing adjustment and trapezoidal distortion correction of a projection video (see JP-A-2003-78842).

SUMMARY OF THE INVENTION

In the above-mentioned focusing adjustment, it is desirable that user's manual adjustment and automatic adjustment by the video display itself can be made. Further, a control system for switching the manual adjustment and the automatic adjustment may be simplified.

In view of the foregoing circumstances, an object of the present invention is to provide a projection type video display capable of switching user's manual adjustment and automatic adjustment by the video display itself by a relatively simple control system.

In order to solve the above-mentioned problem, in a projection type video display that optically modulates light emitted from a light source by a light valve and projects an enlarged video by a projection lens, a projection type video display according to the present invention is characterized by comprising a focusing motor for driving the projection lens; first control means for detecting a user's key operation and feeding a driving signal to the focusing motor; a sensor comprising image pick-up means for picking up a projection video; second control means for judging a focusing position on the basis of an output of the sensor while automatically feeding the driving signal to the focusing motor, and driving the focusing motor by the results of the judgment, to make focusing adjustment; and switching means for selecting the driving signal of the first control means at the time of manual adjustment, while selecting a driving signal of the second control means at the time of automatic adjustment.

In the above-mentioned configuration, manual focusing adjustment is made by manually driving the focusing motor using the first control means at the time of the manual adjustment, and automatic focusing adjustment by the second control means is made at the time of the automatic adjustment. Therefore, user's manual adjustment and automatic adjustment by the video display itself can be switched by a relatively simple control system.

The first control means may feed a processing start command to the second control means and a switching signal to the switching means.

In a projection type video display that optically modulates light emitted from a light source by a light valve and projects an enlarged video by a projection lens, a projection type video display according to the present invention is characterized by comprising a sensor comprising image pick-up means for picking up a projection video; means for making focusing adjustment on the basis of an output of the sensor; and means for making trapezoidal distortion correction on the basis of the output of the sensor, and in that the sensor is arranged at a position in the vicinity of the projection lens.

In this configuration, the projection video emitted from the projection lens and the image pick-up range in the sensor easily conform to each other, thereby allowing good adjustment to be realized.

As described in the foregoing, the focusing adjustment can be automatically made by the video display itself. However, there is a type in which a required time period must be long, although high adjustment precision can be obtained or a type in which high adjustment precision cannot be so expected, although a required time period is conversely short. Each type has some drawback and advantage, and is not satisfactory by a user.

In view of the foregoing circumstances, an object of the present invention is to provide a projection type video display capable of making automatic focusing adjustment which differs in precision depending on user's requirements.

In order to solve the above-mentioned problem, in a projection type video display that optically modulates light emitted from a light source by a light valve and projects an enlarged video by a projection lens, a projection type video display according to the present invention is characterized by comprising a focusing motor for driving the projection lens; a sensor comprising image pick-up means for picking up a projection video; control means for sampling an output of the sensor while automatically feeding a driving signal to the focusing motor, to judge a best focusing position, and driving the focusing motor by the results of the judgment, to make focusing adjustment; and selection means for selecting either of a high-precision automatic focusing adjustment mode and a low-precision automatic focusing adjustment mode on the basis of a user's operation, and in that control for moving the projection lens in its movable range in one direction and then, returning to the best focusing position is carried out in the low-precision automatic focusing adjustment mode, and control for moving the projection lens in its movable range in one direction and then, returning to the best focusing position, further performing the sampling while driving the projection lens in a prescribed range, to judge a new best focusing position, and driving the focusing motor by the results of the judgment, to make focusing adjustment is carried out in the high-precision automatic focusing adjustment mode.

In the above-mentioned configuration, a user may select the high-precision automatic focusing adjustment mode when high adjustment precision is required even if a required time period is long, while conversely selecting the low-precision automatic focusing adjustment mode when a required time period is desired to be short even if very high adjustment precision cannot be expected, thereby making it possible to cope with the difference between user's requirements at different times in the automatic focusing adjustment.

Furthermore, the sampling in the prescribed range in the high-precision automatic focusing adjustment mode may be performed at narrower intervals than the previous sampling intervals.

In a projection type video display that optically modulates light emitted from a light source by a light valve and projects an enlarged video by a projection lens, a projection type video display according to the present invention is characterized by comprising a focusing motor for driving the projection lens; a sensor comprising image pick-up means for picking up a projection video; control means for sampling an output of the sensor while automatically feeding a driving signal to the focusing motor, to judge a best focusing position, and driving the focusing motor by the results of the judgment, to make focusing adjustment; and selection means for selecting either of a high-precision automatic focusing adjustment mode and a low-precision automatic focusing adjustment mode on the basis of a user's operation, and in that a period of the sampling is shortened in the high-precision automatic focusing adjustment mode, while being lengthened in the low-precision automatic focusing adjustment mode.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A liquid crystal projector according to an embodiment of the present invention will be described on the basis of FIGS. 1 to 8.

Figure 1:
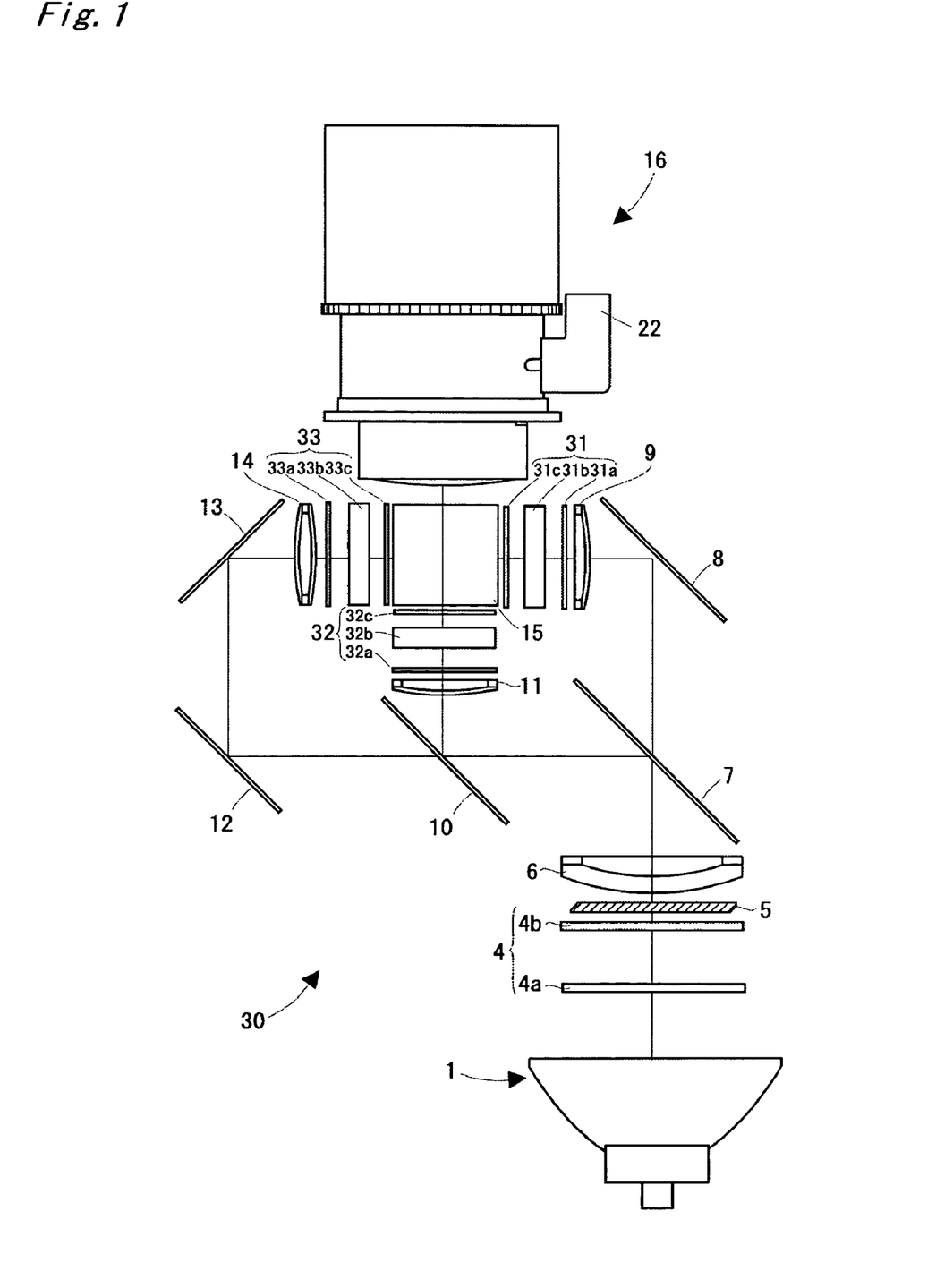
FIG. 1 is a diagram showing the configuration of an optical system of a liquid crystal projector according to an embodiment of the present invention.

FIG. 1 is a diagram showing a three-panel liquid crystal projector 30 according to the present embodiment. A light emitting portion in a light source 1 is composed of a ultra-high pressure mercury lamp, a metal halide lamp, a xenon lamp, or the like, and its irradiated light is emitted after being changed into parallel lights by a parabolic reflector, and is introduced into an integrator lens 4.

The integrator lens 4 is composed of a pair of groups of lenses (fly's eye lenses) 4a and 4b, and lens portions composing each of the fly's eye lenses introduces the light emitted from the light source 1 into the whole surface of a liquid crystal light valve, described later, to average partial non-uniformity in luminance which exists in the light source 1 and reduce the difference between light amounts at the center and the periphery of a screen. The light which has passed through the integrator lens 4 is introduced into a first dichroic mirror 7 after passing through a polarization conversion system 5 and a condenser lens 6.

The polarization conversion system 5 is composed of a polarization beam splitter array (hereinafter referred to as a PBS array). The PBS array comprises polarized light separating surfaces and retardation plates (½λ plates). Each of the polarized light separating surfaces in the PBS array passes P-polarized light and changes an optical path of S-polarized light by 90 degrees, for example, of lights from the integrator lens 4. The S-polarized light whose optical path has been changed is reflected on the adjacent polarized light separating surface and is emitted as it is. On the other hand, the P-polarized light which has passed through the polarized light separating surface is emitted after being converted into S-polarized light by the retardation plate provided on the front side (on the light exit side). That is, nearly all the lights are converted into S-polarized lights in this case.

The first dichroic mirror 7 transmits light in a red wavelength band and reflects light in a cyan (green+blue) wavelength band. The light in the red wavelength band which has passed through the first dichroic mirror 7 is reflected on a reflecting mirror 8 so that its optical path is changed. The red light reflected on the reflecting mirror 8 is optically modulated by passing through a transmission type liquid crystal light valve for red light 31 through a lens 9. On the other hand, the light in the cyan wavelength band which has been reflected on the first dichroic mirror 7 is introduced into a second dichroic mirror 10.

The second dichroic mirror 10 transmits light in a blue wavelength band and reflects light in a green wavelength band. The light in the green wavelength band which has been reflected on the second dichroic mirror 10 is introduced into a transmission type liquid crystal light valve for green light 32 through a lens 11, and is optically modulated by passing through the liquid crystal light valve 32. The light in the blue wavelength band which has passed through the second dichroic mirror 10 is introduced into the transmission type liquid crystal light valve for blue light 33 through a total reflection mirror 12, a total reflection mirror 13, and a lens 14, and is optically modulated by passing through the liquid crystal light valve 33.

The liquid crystal light valves 31, 32, and 33 respectively comprise incidence-side light polarizing plates 31a, 32a, and 33a, panels 31b, 32b, and 33b constructed by sealing a liquid crystal between a pair of glass boards (having a pixel electrode and an alignment film formed therein), and output side light polarizing plates 31c, 32c, and 33c.

The lights (video lights in respective colors) which have been modulated by respectively passing through the liquid crystal light valves 31, 32, and 33 are mixed by a cross dichroic prism 15, to be a full color video light. The full color video light is enlarged and projected by a projection lens 16, and is displayed on a screen 40 (see FIG. 4).

Figure 2:
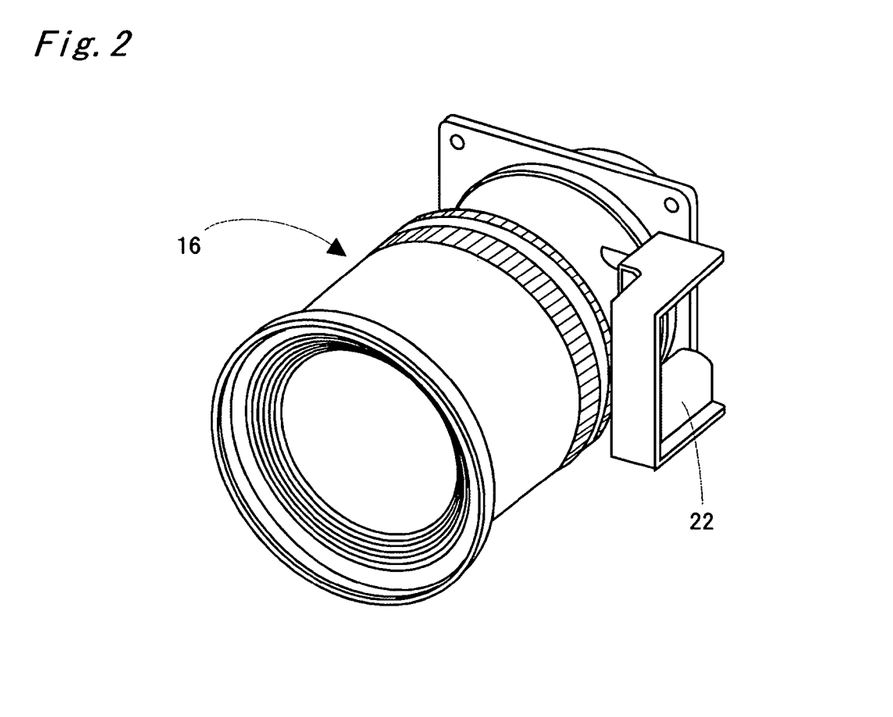
FIG. 2 is a perspective view of a projection lens.

The projection lens 16 comprises a focusing motor (a lens driving motor) 22 for focusing adjustment, as shown in FIG. 2. The lens is moved in a pull-out direction when a pull-out direction driving signal is fed to a focusing motor 22 from a microcomputer 25, described later, while being driven in a pull-in direction when a pull-in direction driving signal is fed to the focusing motor 22.

Figure 3:
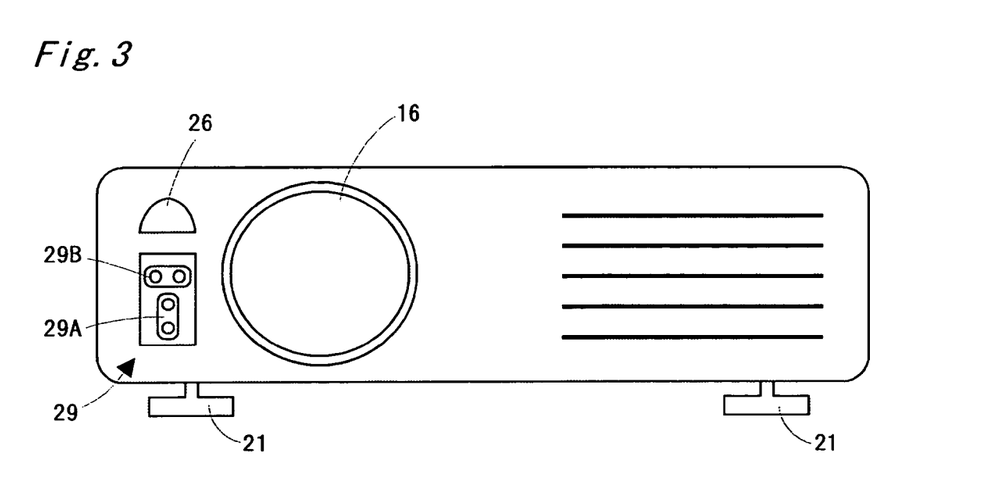
FIG. 3 is a front view of a liquid crystal projector.

FIG. 3 is a front view of a liquid crystal projector 30. Adjusters for angle-of-elevation adjustment 21 are provided on a lower surface of a frame of the liquid crystal projector 30. Further, a sensor 29 is provided at a position in the vicinity of the side of a projection lens 16 (e.g., within 5 cm from an outer peripheral edge of the lens 16), and a remote control signal light receiver 26 is provided above the sensor 29. Although the projection lens 16 is attached to a main body chassis (not shown), the remote control signal light receiver 26 and the sensor 29 are attached to a front cover.

Figure 4:
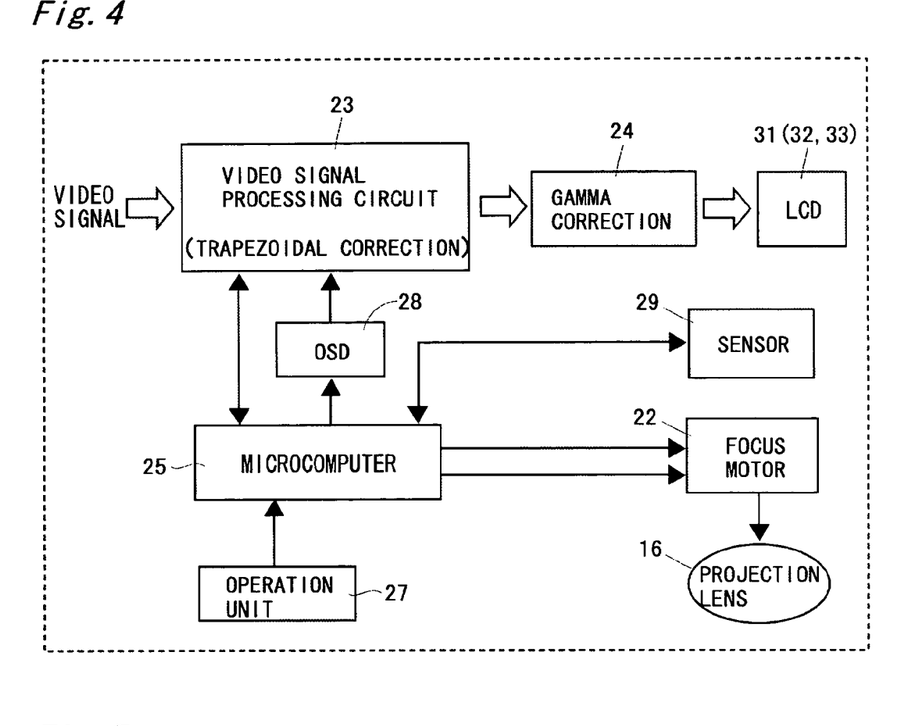
FIG. 4 is a block diagram showing an electrical circuit system of a liquid crystal projector.
Figure 8:
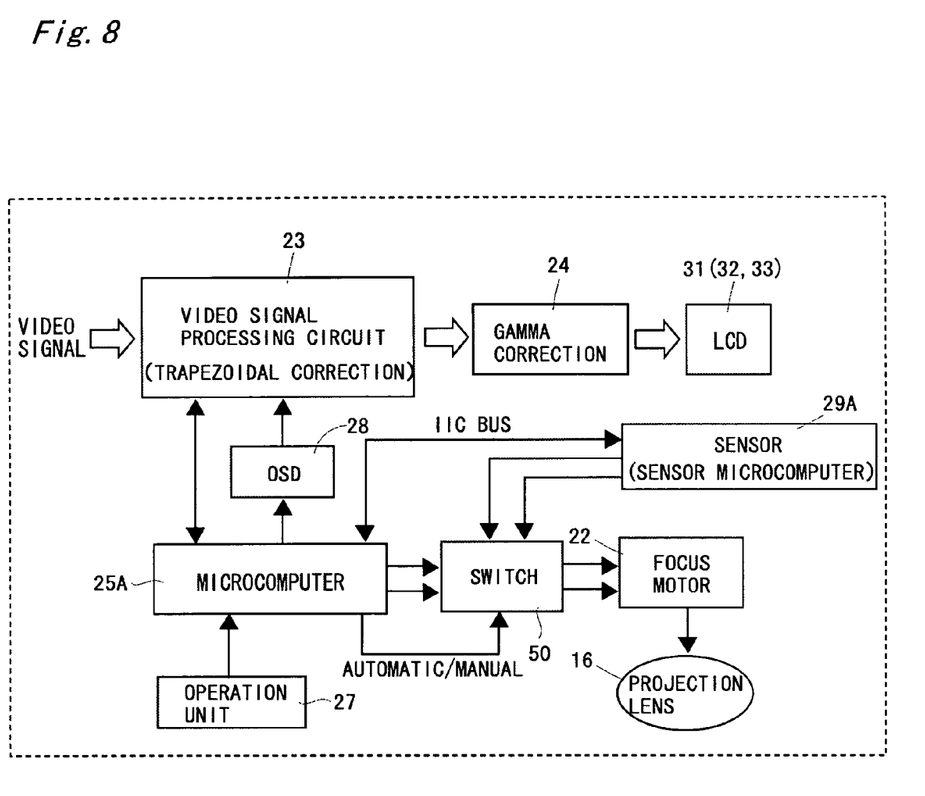
FIG. 8 is a block diagram showing another electrical circuit system of a liquid crystal projector.

FIGS. 4 and 8 is a block diagram showing the outline of an electrical system of the liquid crystal projector 30. A video signal processing circuit 23 inputs a video signal to perform processing such as frequency conversion (conversion of the number of scanning lines) as well as processing such as image processing serving as trapezoidal distortion correction on the basis of a command from the microcomputer 25. A gamma correction circuit 24 performs correction processing in view of applied voltage/optical transmission characteristics of a liquid crystal light valve (LCD), and feeds a video signal (video data) after the correction to the liquid crystal light valve (drives the liquid crystal light valve).

An operation unit (or a remote control transmitter) 27 is provided with keys for various types of operations. In the present embodiment, there are provided as the above-mentioned keys an automatic adjustment command key for commanding that focusing adjustment and trapezoidal distortion correction should be made, a manual instruction key and a manual focusing direction key for performing manual adjustment for focusing, and so on. Further, there are provided an instruction key for instructing whether focusing adjustment is made quickly (at high speed and with low precision) or in detail (at low speed and with high precision), and so on.

An OSD (On-Screen Display) circuit 28 performs processing for generating video data based on character information and figure information which the microcomputer 25 is instructed to output and incorporating the video data into input video data.

Figure 5:
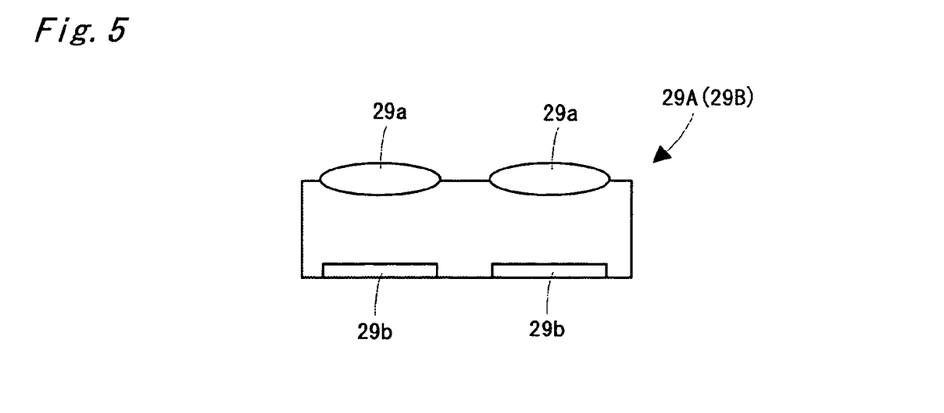
FIG. 5 is a diagram showing the schematic configuration of a sensor.
Figure 6A:
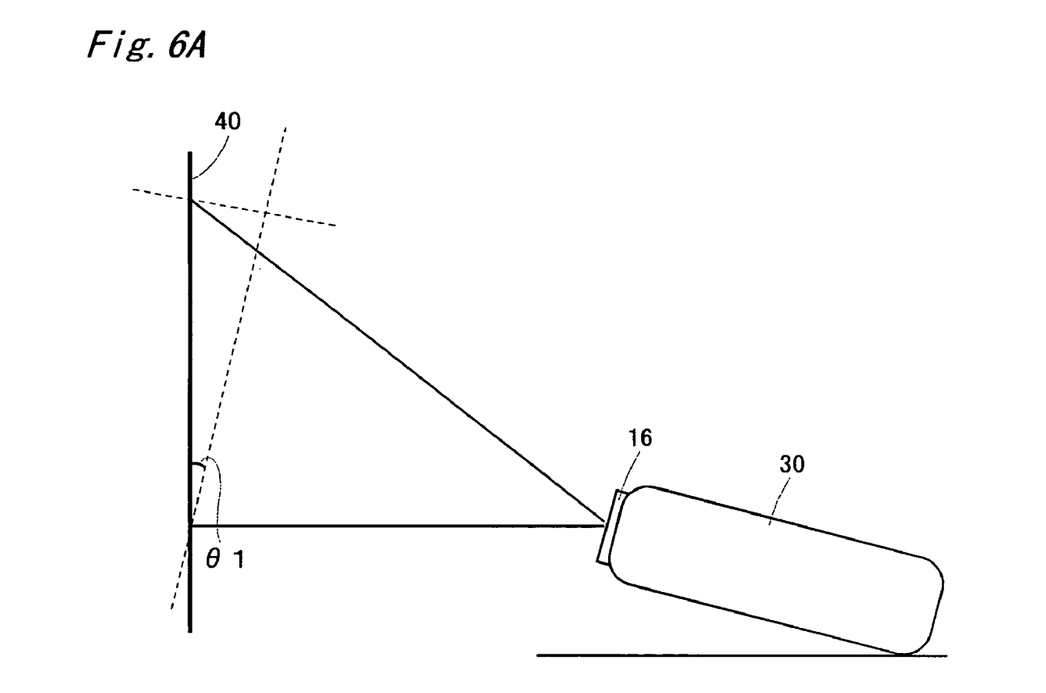
FIG. 6A is an explanatory view showing how longitudinal trapezoidal distortion is induced.
Figure 6B:
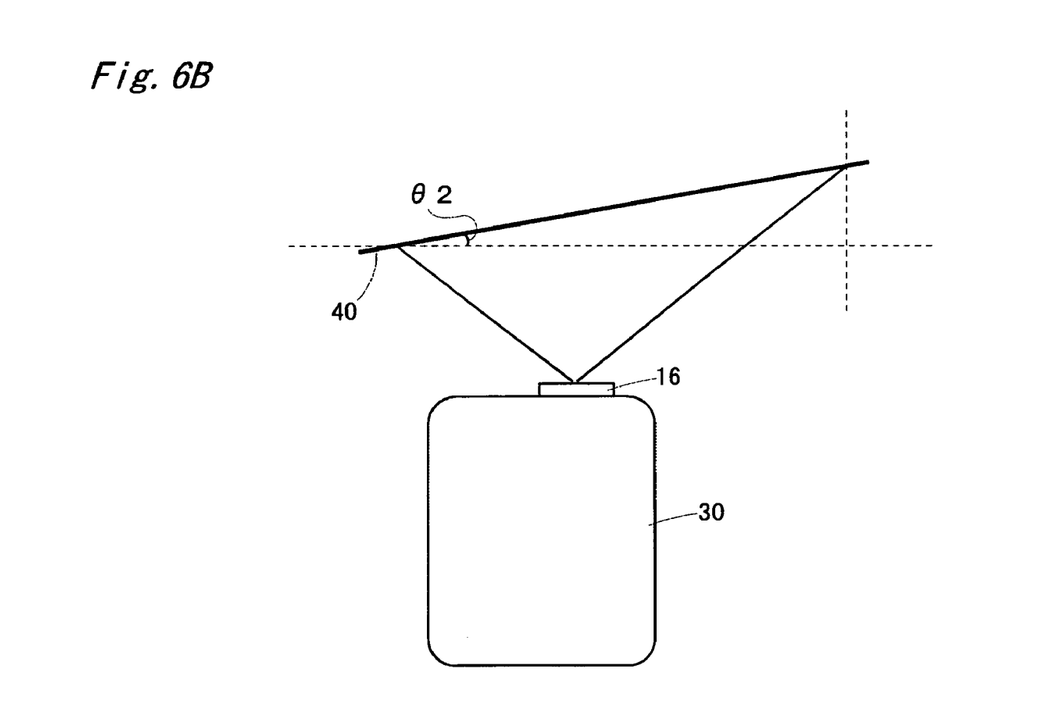
FIG. 6B is an explanatory view showing how lateral trapezoidal distortion is induced.

The sensor 29 comprises a first sensor portion 29A and a second sensor portion 29B. Each of the sensor portions 29A (29B) comprises two lenses 29a and CCD line sensors 29b respectively provided in correspondence with the lenses 29a, as shown in FIG. 5. The CCD line sensor 29b is formed so as to extend in the direction in which the lenses 29a are arranged. As the sensor portion 29A (29B), sensors disclosed in JP-A-2002-213946 and JP-A-2003-57531 can be utilized.

The first sensor portion 29A is arranged such that the lenses 29a are arranged in the vertical direction, and the second sensor portion 29B is arranged such that the lenses 29a are arranged in the horizontal direction (see FIG. 3).

In an example shown in FIG. 8, the sensor 29A comprises a microcomputer (hereinafter referred to as a sensor microcomputer). The sensor microcomputer 29A can exchange an instruction and data with the microcomputer 25 through an IIC (Inter-Integrated Circuit) bus, and has a motor driving control line so that driving control of the focusing motor 22 can be carried out by itself. The sensor microcomputer 29A in FIG. 8 or the microcomputer 25 in FIG. 4 samples an image pick-up signal of each CCD line sensor 29b to generate image pick-up data, to calculate contrast data and angle data. The contrast data is a signal representing the degree of a high-frequency component on the image pick-up signal outputted by the CCD line sensor 29b, and indicates that the higher the degree of the high-frequency component on the image pick-up signal is, the better the lenses are in focus. Further, the angle data includes first angle data θ1 (see FIG. 6A) representing the degree of longitudinal trapezoidal distortion obtained by the first sensor portion 29A and second angle data θ2 (see FIG. 6B) representing the degree of lateral trapezoidal distortion obtained by the second sensor portion 29B.

The angle data can be obtained by arithmetic processing based on the results of measurement of the distance from the sensor 29 to a projection video for adjustment (the screen 40). The distance is measured by so-called triangular surveying, and can be found from the relative shift (a phase difference) of a video picked up on each of the CCD line sensors 29b in the sensor portion 29A (29B), the focal length of the lenses, and the distance between the lenses. The distance measurement can be made for each of a plurality of areas in a range where the projection video for adjustment is picked up. That is, a range of imaging of the CCD line sensor 29b is divided into a plurality of areas, and the results of the distance measurement can be calculated for each of the areas. For example, the distance measurement is made with respect to the uppermost area and the lowermost area (the leftmost area and the rightmost area) of the projection video for adjustment. The difference in the measured distance value between the uppermost area and the lowermost area (the leftmost area and the rightmost area) is a large value corresponding to the degree of non-perpendicularity between a projection optical axis and the screen. An arctangent is found from the differences between the distance between the uppermost area and the lowest area (the left most area and the right most area) and the measured distance value, thereby allowing the angle data (θ1, θ2) to be calculated.

The microcomputer 25 and 25A carry out overall control in the liquid crystal projector 30. Adjustment control of setting at the time of projection, described later, is carried out particularly as control according to the present invention by the microcomputer 25. In the example in FIG. 8, the sensor microcomputer 29A carries out the prescribed control. The adjustments include manual adjustment and automatic adjustment. The automatic adjustment will be described.

(Single Mode)

A user does not press the automatic adjustment command key in the operation unit 27 until the light source enters a sufficiently luminescent state after the power supply is turned on. The microcomputer 25 performs image drawing processing of the projection video for adjustment by the OSD circuit 28 when it detects the press of the automatic adjustment command key. An image having a black-and-white area high in contrast formed therein may be used as the projection video for adjustment. In the example in FIG. 8, the microcomputer 25A gives a start instruction to the sensor microcomputer 29A, and gives a switching command to the switch 50 so as to select a motor control signal from the sensor microcomputer 29A.

The microcomputer 25 feeds the pull-out direction driving signal to the focusing motor 22, and samples the image pick-up signal of the CCD line sensor 29b, to generate contrast data. In the example in FIG. 8, the sensor microcomputer 29A feeds the pull-out direction driving signal to the focusing motor 22, and samples the image pick-up signal of the CCD line sensor 29b, to generate contrast data when it receives the start instruction. The sensor microcomputer 29A or the microcomputer 25 starts a timer when it starts the above-mentioned sampling, and generates the contrast data at predetermined time intervals and stores the generated contrast data in a memory (not shown). The sensor microcomputer 29A or the microcomputer 25 judges the best contrast data, to acquire time information (in-focus lens position information) in a case where the contrast data is obtained. The sensor microcomputer 29A or the microcomputer 25 feeds the pull-in direction driving signal to the focusing motor 22 by a time period obtained by subtracting the time information from the whole time period during which it feeds the pull-out direction driving signal to the focusing motor 22. Focusing adjustment is thus realized.

(Dual Mode)

Here, description will be made in a case where no sensor microcomputer is comprised (see FIG. 4). A user operates an instruction key in an operation unit 27, to specify whether focusing adjustment is made quickly (at high speed and with low precision) or in detail (at low speed and with high precision). The microcomputer 25 detects an operation of the instruction key, to make mode judgment. The microcomputer 25 performs image drawing processing of the projection video for adjustment by the OSD circuit 28 when it detects the press of the adjustment command key. An image having a black-and-white area high in contrast formed therein may be used as the projection video for adjustment. The microcomputer 25 feeds the pull-out direction driving signal to the focusing motor 22, and samples the image pick-up signal of the sensor 29, to generate contrast data The microcomputer 25 starts a timer when it starts the above-mentioned sampling, and generates the contrast data at predetermined time intervals and stores the generated contrast data in a memory (not shown). The microcomputer 25 judges the best contrast data, to acquire time information (in-focus lens position information) in a case where the contrast data is obtained. There is a mountain-shaped relationship as shown in FIG. 7 between an elapse of time (a lens position) since a timer was started and contrast.

Figure 7:
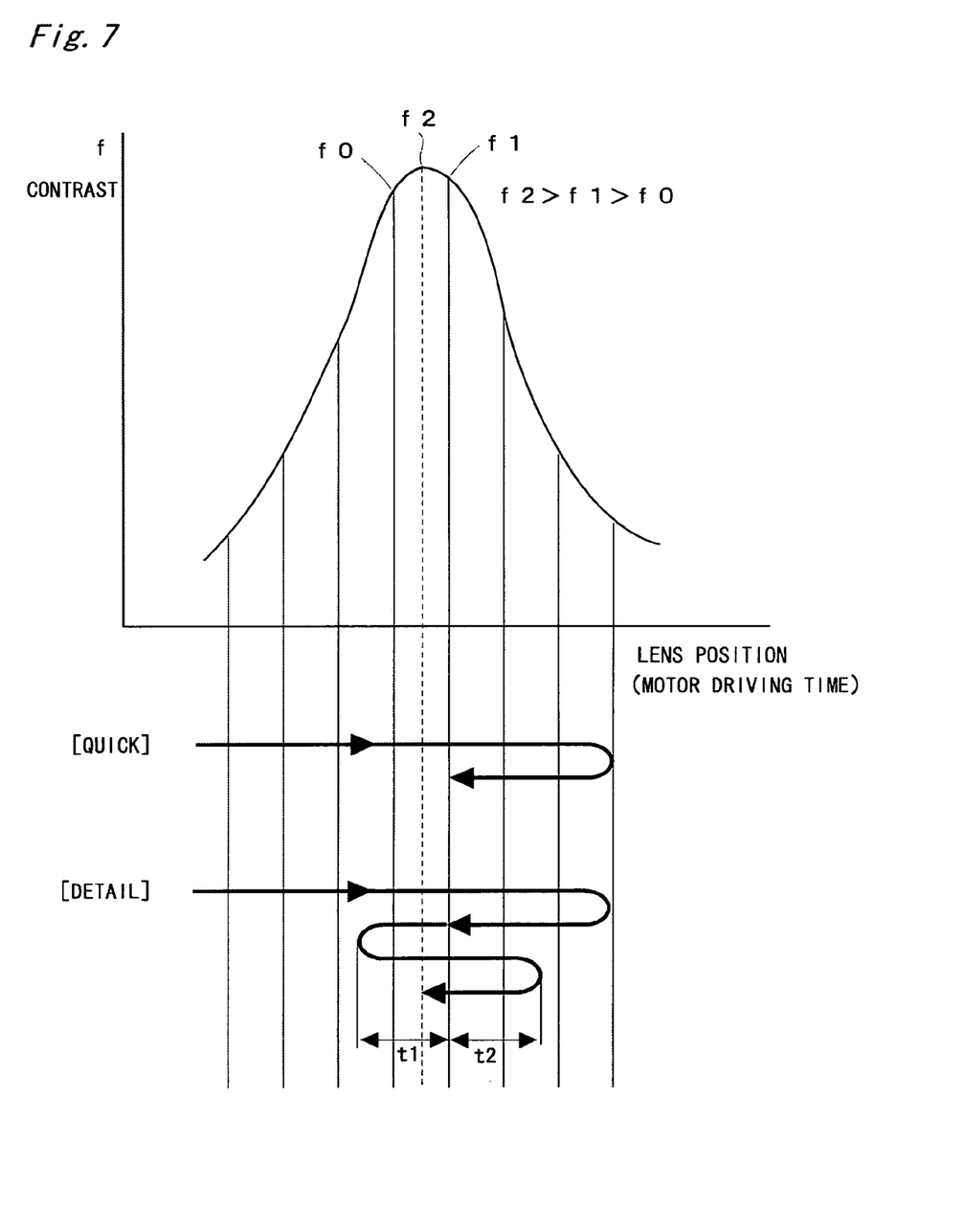
FIG. 7 is an explanatory view showing the relationship between an elapse of time (a lens position) since a timer was started and contrast and schematic operations in a quick mode and a detail mode.

The microcomputer 25 feeds the pull-in direction driving signal to the focusing motor 22 by a time period obtained by subtracting the time information from the whole time period during which it feeds the pull-out direction driving signal to the focusing motor 22 (see [QUICK] in FIG. 7). When a quick mode is specified, focusing adjustment is terminated. On the other hand, in a detail mode, the sampling is further performed while driving the projection lens 16 in a prescribed range after that, to judge a new best focusing position (an in-focus lens position), and the focusing motor 22 is driven to make focusing adjustment by the results of the judgment, as indicated by [DETAIL] in FIG. 7. The prescribed range exists as time information (motor driving time) on a program. For example, sampling is performed while feeding a pull-in direction driving signal to the focusing motor 22 by a time period t1, sampling is then performed while feeding a pull-out direction driving signal to the focusing motor 22 by a time period (t1+t2), to judge the best contrast data therebetween. Focusing adjustment is made by time information in a case where the contrast data is obtained. Above-mentioned adjustment is carried out by the sensor microcomputer 29A in the example in FIG. 8.

(Trapezoidal Distortion Correction)

Furthermore, the sensor microcomputer 29A or the microcomputer 25 makes trapezoidal distortion correction on the basis of image pick-up data of the CCD line sensor 29b. In the trapezoidal distortion correction, as described above, the angle data based on the differences between the distance between the uppermost area and the lowermost area and the measured distance value (the angle data for longitudinal trapezoidal distortion correction) and the angle data based on the differences between the distance between the leftmost area and the rightmost area and the measured distance value (the angle data for lateral trapezoidal distortion correction) are calculated. The angle and the degree of trapezoidal distortion are in a proportional relationship. If the angle becomes clear, it can be determined what degree of correction should be made with respect to an image. In the example in FIG. 8, the sensor microcomputer 29A transmits angle data to the microcomputer 25A through the IIC bus. For example, the video signal processing circuit 23 receives the angle data from the microcomputer 25, 25A, to perform pixel interpolation/pixel thinning processing of input video data such that an image has trapezoidal distortion whose shape is opposite to that of trapezoidal distortion which is estimated to be produced in projection at the angle. Since the sensor 29A is provided with a dedicated microcomputer in the example in FIG. 8, to perform processing such as focusing adjustment and angle data calculation in the dedicated microcomputer 29A at the time of automatic adjustment, the microcomputer 25A can assign its processing capability for another processing.

(Manual Focusing Adjustment)

Manual focusing adjustment will be then described on the basis of FIG. 4. The microcomputer 25 performs image drawing processing of a projection video for adjustment by the OSD circuit 28 when it detects the press of a manual instruction key, and gives a switching command to the switch 50 so as to select a motor control signal from the microcomputer 25. The microcomputer 25 outputs a pull-out direction driving signal when it detects the press of a manual focusing direction key serving as a pull-out command, and outputs a pull-in direction driving signal when it detects the press of a manual focusing direction key serving as a pull-in command. A user may stop a key operation at the time point where he or she sees the projection video for adjustment and feels that the projection video for adjustment is the clearest. Above-mentioned manual adjustment is carried out by the microcomputer 25A in the example in FIG. 8.

The above-mentioned methods such as focusing adjustment and trapezoidal distortion correction are not limited. Any method may be used. Although the user does not press the automatic adjustment instruction key in the operation unit 27 until a light source enters a sufficiently luminescent state after the power supply is turned on, the timer may be started after the power supply is turned on, for example, to automatically perform adjustment processing after an elapse of a predetermined time period during which the light source enters a sufficiently luminescent state. Although the projection video for adjustment produced by the OSD circuit 28 is an image having a black-and-white area formed therein in order to obtain high contrast, the projection video for adjustment need not be necessarily limited to the image having a black-and-white area formed therein. Further, the image is not limited to a single image. A plurality of images may be prepared. Of course, a projection video for adjustment may be produced by not the OSD circuit 28 but external input. Further, the progress of adjustment, the type of mode, and so on may be displayed as a message at a corner of the projection video for adjustment, for example, by the OSD circuit 28. Although the transmission type liquid crystal projector was illustrated as a projection type video display, a reflection type liquid crystal projector may be used. Alternatively, the projection type video display may be not only the liquid crystal projector but also a projection type video display of such a type that a lot of micro mirrors are driven to perform light modulation.

Although in the focusing adjustment in the above-mentioned detail mode, further sampling in the above-mentioned prescribed range is performed at intervals which are not changed from the previous sampling intervals, the further sampling in the prescribed range may be performed at narrower intervals than the previous sampling intervals. The further sampling in the prescribed range may be performed a plurality of times.

Furthermore, it may be specified whether focusing adjustment is made in a low-precision mode or a high-precision mode, and an operation of moving a projection lens in its movable range in one direction and then, returning to a focusing position may be performed in both the low-precision mode and the high-precision mode in the same manner, as in the above-mentioned quick mode. A period of the sampling may be shortened in the high-precision mode, while being lengthened in the low-precision mode.

Although all data (contrast data, time information) obtained by the sampling may be stored in a memory (a memory such as a memory contained in the microcomputer 25 or an external RAM) to judge the best contrast data, comparison processing with the previous contrast data may be performed every time the contrast data is obtained by sampling, and only the data (contrast data, time information) having the larger contrast may be updated.

As described in the foregoing, according to the present invention, user's manual adjustment and automatic adjustment by the video display itself can be switched in a relatively simple control system. If it can be specified whether the focusing adjustment is made quickly (at high speed and with low precision) or in detail (at low speed and with high precision), the effect of meeting user's requirements at different times is produced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display that optically modulates light emitted from a light source by a light valve and projects an enlarged video by a projection lens, comprising:
    a focusing motor for driving said projection lens;
    first control means for detecting a user's key operation and feeding a driving signal to the focusing motor;
    a sensor comprising image pick-up means for picking up a projection video;
    second control means for judging a focusing position on the basis of an output of the sensor while feeding the driving signal to the focusing motor, and driving the focusing motor by the results of the judgment, to make focusing adjustment; and
    switching means for selecting the driving signal of the first control means at the time of manual adjustment, while selecting the driving signal of the second control means at the time of automatic adjustment.

2. The projection type video display according to claim 1, wherein
    the first control means feeds a processing start command to the second control means and a switching signal to the switching means.

3. A projection type video display that optically modulates light emitted from a light source by a light valve and projects an enlarged video by a projection lens, comprising:
    a sensor comprising image pick-up means for picking up a projection video;
    means for making focusing adjustment on the basis of an output of the sensor; and
    means for making trapezoidal distortion correction on the basis of the output of the sensor, and wherein
    the sensor is arranged at a position in the vicinity of the projection lens.

4. A projection type video display that optically modulates light emitted from a light source by a light valve and projects an enlarged video by a projection lens, comprising:
    a focusing motor for driving the projection lens;
    a sensor comprising image pick-up means for picking up a projection video;
    control means for sampling an output of the sensor while automatically feeding a driving signal to the focusing motor, to judge a best focusing position, and driving the focusing motor by the results of the judgment, to make focusing adjustment; and
    selection means for selecting either of a high-precision automatic focusing adjustment mode and a low-precision automatic focusing adjustment mode on the basis of a user's operation, and wherein
    control for moving the projection lens in its movable range in one direction and then, returning to said best focusing position being carried out in the low-precision automatic focusing adjustment mode, and control for moving the projection lens in its movable range in one direction and then, returning to said best focusing position, further performing said sampling while driving the projection lens in a prescribed range, to judge a new best focusing position, and driving the focusing motor by the results of the judgment, to make focusing adjustment being carried out in the high-precision automatic focusing adjustment mode.

5. The projection type video display according to claim 4, wherein
    the sampling in the prescribed range in the high-precision automatic focusing adjustment mode is performed at narrower intervals than the previous sampling intervals.

6. A projection type video display that optically modulates light emitted from a light source by a light valve and projects an enlarged video by a projection lens, comprising:
    a focusing motor for driving said projection lens;
    a sensor comprising image pick-up means for picking up a projection video;
    control means for sampling an output of the sensor while automatically feeding a driving signal to the focusing motor, to judge a best focusing position, and driving the focusing motor by the results of the judgment, to make focusing adjustment; and
    selection means for selecting either of a high-precision automatic focusing adjustment mode and a low-precision automatic focusing adjustment mode on the basis of a user's operation, and wherein
    a period of the sampling is shortened in the high-precision automatic focusing adjustment mode, while being lengthened in the low-precision automatic focusing adjustment mode.

* * * * *